United States Patent Office 3,220,391
Patented Nov. 30, 1965

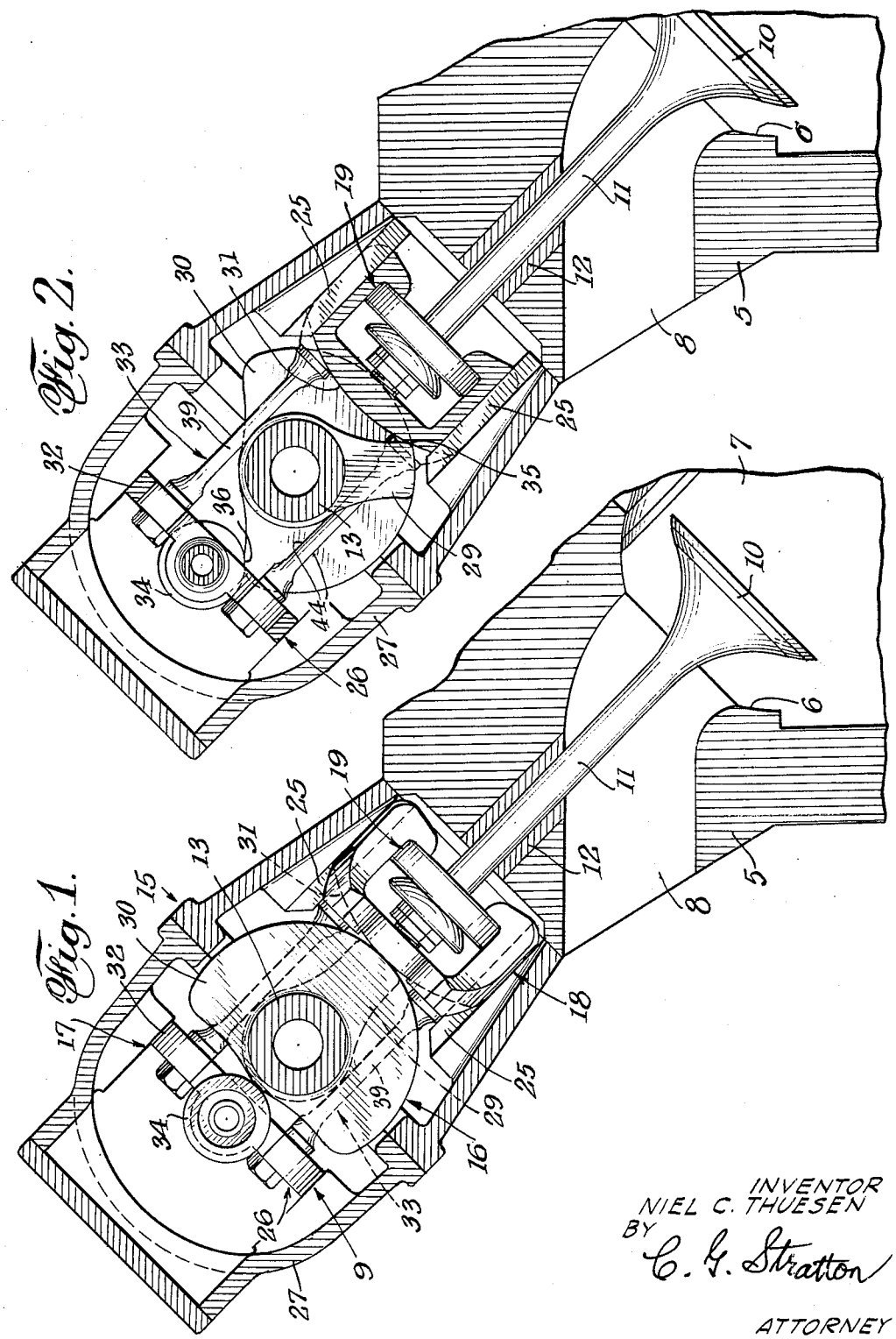

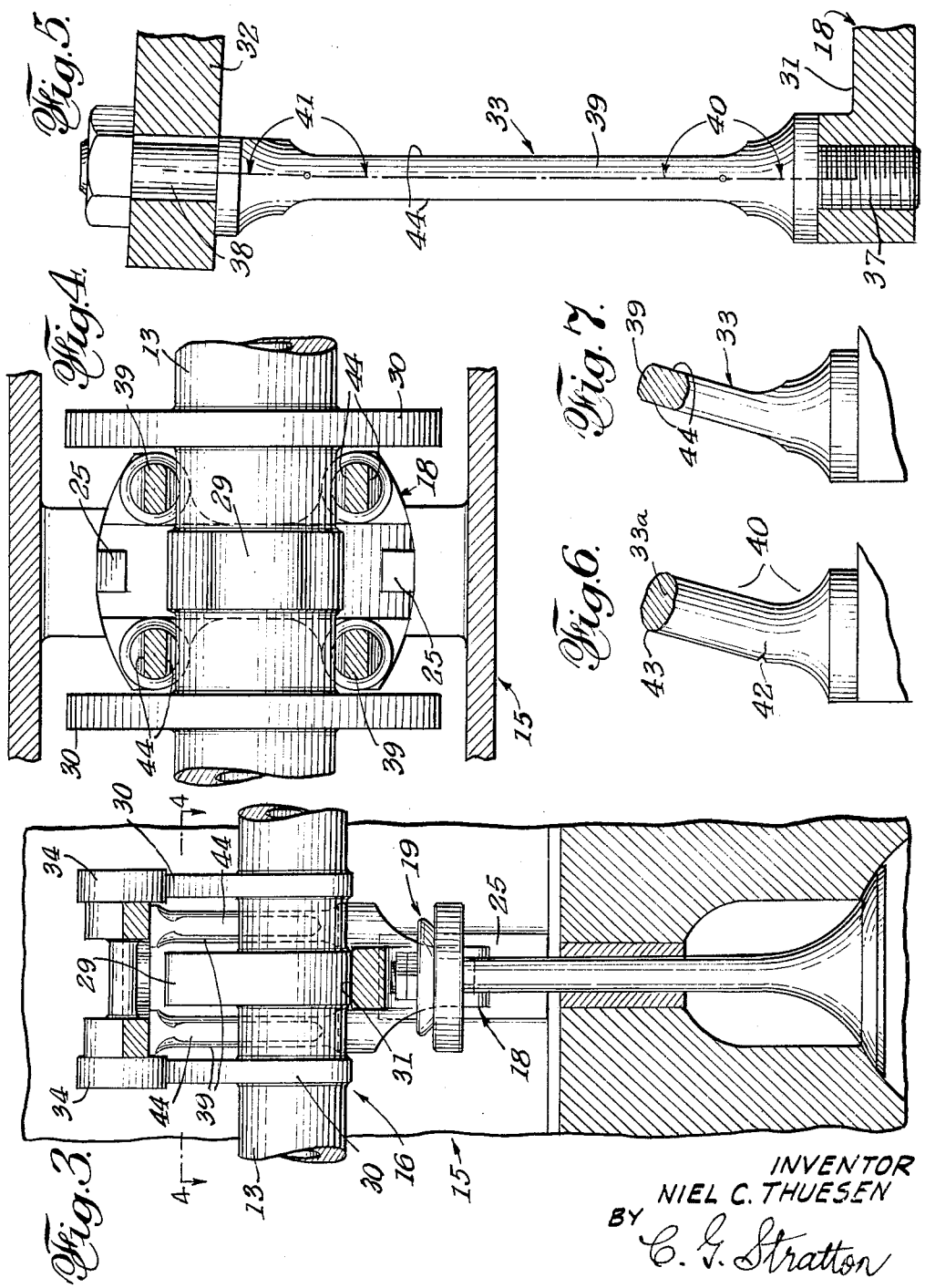

3,220,391
POPPET VALVE-ACTUATING MECHANISM
Niel C. Thuesen, 6021 Compton Ave., Los Angeles, Calif.
Filed Jan. 8, 1965, Ser. No. 424,428
6 Claims. (Cl. 123—90)

This invention relates to mechanism for accurately controlling opening and closing of poppet valves of internal combustion engines, and for similar uses, such as in air compressors for opening control valves and for holding said valves closed against stored pressure.

This application discloses mechanism that is an improvement of the mechanism disclosed in Serial No. 334,417, filed Dec. 30, 1963.

Conventional poppet valve mechanisms employ cam shafts that, through operation of rocker arms, open the poppet valves of an engine, springs being provided to carry out return movement that closes the valves. Hence, only the opening movement of the valves is positively controlled. Moreover, the springs introduce a time lag in the operation, in addition to being impositive in operation. Further, such springs impose a load that requires expenditure of power to overcome, and also are a source of friction buildup in the valve movement.

A general object of the invention is to provide poppet valve-actuating mechanism that, by eliminating spring control during movement of the valve in one direction, provides an operation that is carried out with minimum power expenditure, since the control is substantially power-balanced through the entire operation cycle.

Another object of the present invention is to provide control means that is positive in operation both when opening and when closing poppet valves.

A further object of the invention is to provide poppet valve-actuating mechanism as characterized above that, while employing means to positively close the valve, provides also for compression compensation at the end of the valve-closing movement, thereby insuring tight valve closure irrespective of pressure differentials on both sides of the valve.

The objects above listed are realized in a construction that comprises a cage that is reciprocated and guided for longitudinal movement by complementary or reciprocal cam means to move a poppet valve toward and from seated position controlling flow in a port. The cam means operates between an outer cage part and an inner tappet part, the latter being connected to the poppet valve. While the axes of the cam shaft and of the poppet stem intersect, the forces imposed by the cam means on said outer and inner cage parts are directly along the axis of the poppet stem only, at two diametrically aligned positions of the cam means. At all other radial positions of the cam means, the latter are in operative contact with portions of the cage parts that are displaced in varying degrees from the longitudinal axis of the poppet stem Accordingly, the opposed forces on said cage parts not only create varying tensions on the portions of the cage that connect the inner and outer cage parts, but cause a small alternating change of angle between the cage parts.

The exigencies of space and weight demand that the portions of the cage that connect the outer part and the inner tappet part be as small and light as possible and yet give desired and accurate service over long periods of time, at high engine speeds and under varying heat conditions. A set of four round-sectioned connecting rods of a cross-sectional size suited for the forces involved have been used for this purpose, but due to metal fatigue resulting from the above-mentioned varying tensions on the rods and alternative changes of angle between the cage parts, the rods prematurely failed to carry out their prescribed functions.

Accordingly, it is another object of the invention to provide connecting rods for the opposed cage parts that are not only space-saving and strong for the purpose intended, but also are so formed, cross-sectionally, as to materially increase resistance to failure due to metal fatigue brought about by the mentioned elongations of the posts and variations in the angle included between the opposite parts of the cage.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, and which is based on the accompanying drawings. However, said drawings merely show, and the following description merely describes, one embodiment of the present invention, which is given by way of illustration or example only.

In the drawings, like reference characters designate similar parts in the several views.

FIG. 1 is a vertical sectional view of a poppet valve-actuating mechanism according to the present invention and shown in full valve-open position.

FIG. 2 is a similar view showing the mechanism in a position in which the valve is partly closed.

FIG. 3 is a vertical sectional view of the mechanism taken at right angles to FIG. 1 and showing the same with the poppet valve closed.

FIG. 4 is an enlarged cross-sectional view as taken on the line 4—4 of FIG. 3.

FIG. 5 is a further enlarged view showing one of the cage parts-connecting posts, as tensioned and flexed under the forces applied to the outer and inner parts of the cage.

FIG. 6 is a still further enlarged fragmentary view showing in an exaggerated manner, the fissure resulting from metal failure due to fatigue, of a round connecting rod.

FIG. 7 is a similar view of a connecting rod formed according to the present invention.

The drawings show a portion of a cylinder block 5 of an internal combustion engine or the like, a valve seat 6 in said cylinder block for communicating, when open, the cylinder chamber 7 and a flow passage 8 that may be an intake or exhaust passage. The present mechanism 9 is mounted on said cylinder 5, the same controlling reciprocative movement between open and closed positions of a poppet valve 10 on the end of a stem 11 that is guided in a bushing or guide 12 in the cylinder block 5. An overhead cam shaft 13 is shown in operative association with said mechanism 9, it being clear that said shaft controls a plurality of valves 10 in aligned arrangement along the cylinder block 5.

The poppet valve mechanism 9 that is illustrated comprises, generally, a guide housing 15 affixed to the cylinder block 5 and through which the cam shaft 13 extends, cam means 16 provided on said cam shaft in centered relation, as in FIG. 3, with respect to the valve 10, a cage 17 operatively associated with said cam means 16 and reciprocated thereby in the guide provided by the housing 15, said cage being provided at its lower end with a tappet portion 18, and means 19 mounted on the valve stem 11 and engaged with the tappet portion 18 for providing compression compensation for the closing movement of the poppet valve, as controlled by the cam means 16.

The guide housing 15 is provided with slide guides 25 for the inner tappet portion 18 of the cage 17. The outer portion 26 of the cage may be guided in an overhead portion 27 of the housing 15.

The cam means 16 comprises complementary or reciprocal cams 29 and 30, the cam 29 comprising a valve-opening cam that is centered on the valve stem 11, and the cams 30, a pair of control cams, one on each side of the cam 29, as can best be seen in FIG. 3.

The cage 17 comprises a lower part that is the tappet part 18, the same having a convex surface 31 that is engaged by the lobe or rise of the cam 29 to cause the cage to move in a direction toward the valve seat 6. Said cage 17, on the opposite side of the tappet part 18, is provided with a frame 32 that is connected to the tappet part by a set of four rods 33 straddling the cam shaft, two on each side of the cam 29 between said cam and one of the control cams 30. Said frame 32 mounts a pair of cam followers 34 that are engaged with the cams 30 so the rises of said latter cams cause the cage 17 to move in a direction away from the valve seat 6.

The above-described complementary or reciprocal cams cooperate so that the lobe of the valve-opening cam 29 is effective, through part of the cam cycle, to move the cage in a valve-opening direction while the cams 30 maintain a control contact with the followers 34, and so that the lobes of the two control cams 30 are effective, through the remainder of the cam cycle, to move the cage in a valve-closing direction.

FIG. 4 more particularly shows the compact arrangement and relationship between the rods 33, on the one hand, and the cam shaft 13 and the cams 29 and 30 of the complementary cam means 16. It will be clear, from this view, that the rods 33 are located as closely as practical to the cam shaft 13, thus enabling design of the cage with as small a transverse spread as is practical.

It will be clear from FIGS. 1 and 3 that, due to the aligned relationship of the axis of the stem 11 and the diametral points of engagement of cams 29 and 30, respectively, with surface 31 and cam followers 34, the only time that the cam means 16 has a straight-line engagement relationship with the valve stem axis 11 is when the valve 10 is fully open or fully closed. At all other times, the lobe of cam 29 has contact with the surface 31, the same having an offset contact with said surface, as seen for instance, in FIG. 2 at 35. This makes it clear that said lobe of cam 29 wipes over the surface 31 for most of its transverse extent and that, for the most part, the contact is with a point on said surface that is offset from the poppet valve 10. Also, as shown in FIG. 2, the followers 34 are engaged by cams 30, as at 36, points that are offset from the mentioned aligned relationship.

It will be realized that these exemplary contact points 35 and 36 not only shift toward and from the aligned relationship, they shift alternately from one side to the other of this axial line. As a consequence, the two rods 33 on one side of said line will be subjected to greater forces, in tension, than the other two, and this differential of forces will alternate between the two pairs of rods, stretching them alternately.

As a result of this alternate elongation of the pairs of rods, the outer cage portion 26 will be moved to a non-parallel relationship with inner cage portion 18, first one side of the cage and then the other being spread in the manner suggested in FIG. 5. It will be clear that the studs 37 and 38 on the end of the rods 33 are engaged with or connected to the cage portions 18 and 26, respectively.

When a rod 33 is under tension greater than is the rod on the opposite side, the intermediate portion 39 thereof remains straight, as in FIG. 5, and two obtuse angles 40 and 41 are formed between said portion 39 and the respective studs 37 and 38.

The angle 40 is shown, in exaggerated form, in FIG. 6 in connection with a rod 33a which has the rod portion 39a of round cross-section. This view also shows that, as a result of repeated flexures of the rod at this point, the metal will become fatigued and a fissure or tear 42 will form, primarily because the greatest stretch at the bend of angle 40 is across a line 43 and the tear meets only the resistance at said line. Once the tear starts, it more easily deepens until complete failure of the rod ensues.

According to the invention, the resistance to failure due to metal fatigue is materially increased by forming surfaces or flats 44 on the opposite faces of the rod portion 39. Hence, the line 43 is widened to a surface, as shown in FIGS. 3 and 7, which, due to its transverse width, has materially increased resistance to metal fatigue. The flats 44 are merely exemplary of surfaces that are flatter than the curved surfaces of a round rod. Accordingly, rods having an oval cross-sectional form will have surfaces that, while curved, are materially flatter than the curves of round rods. Such flatter curved surfaces are deemed to fall into the term "flat" as used above. The planes of the flats 44 are transverse to the line or angle of bend of the rods 33.

It will be understood that the means 19, that per se forms no part of the novel features of the present invention, under action of the cam means 16, particularly the cam 29, pulls on the valve 10 to close the port 8. When the valve is drawn to seated engagement with the valve seat 6, the lobe of cam 29 wipes across the followers 34 in an arcuate path that, as explained above, imparts uneven stretch forces on the rods 33 on one side of the cam shaft 13 then on the rods on the opposite side. Only when the cam lobe reaches top dead center are such stretch forces equal on all of the rods. It will be evident that carbon or other particles that prevent proper seating of the valve greatly increase the unevenness of the forces to which the cage rods 33 are subjected.

As indicated best in FIG. 2, the pairs of rods 39 are spaced from each other a distance greater than the wiping distance by the cams 30 across the followers 34. Also, said rod spacing is greater, or at least as great, as the wiping distance of the lobe of cam 29 across the tappet surface 31. By this arrangement, the stretch or tension forces on the rods are kept within the base formed by the four rods 33.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described the invention, what is claimed and desired to be secured by Letters Patent is:

1. Actuating mechanism for a poppet valve having a connection with a sliding cage that is reciprocated by rotating cam means having reciprocal cams, one to move the cage in a valve-opening direction and the other to move the cage in valve-closing direction, said mechanism comprising:
   (a) a cage part engaged by one said cam,
   (b) a cage part engaged by the reciprocal cam,
   (c) said cams having wiping movement across and variable angular relationships and contacts with the respective cage parts, and
   (d) a set of rods connecting said cage parts and having flat faces throughout the greater portion of their length that are transverse to the plane in which the cam means rotates and of greater width than the thickness of said rods.

2. Actuating means according to claim 1, said rods being arranged in pairs that are offset on opposite sides of the axis of the cam means.

3. In poppet valve-actuating mechanism having a reciprocative cage with opposite inner and outer portions, the former being connected to and moving the poppet between open and closed position, the combination of:
   (a) rotative reciprocal cam means to move the cage by variable-angle wiping engagement with said opposite portions of the cage, and
(b) a set of rods terminating in threaded studs at each end and connecting said portions and subject to bending forces imposed by the cams while placing the rods in tension.
(c) said rods each having surfaces that reside in planes transverse to the axis on which the cam means is disposed of relatively greater dimension and of less curvature than the other transverse dimension to provide maximum resistance when subjected to differential forces occurring between the cams and cage during the wiping operation.

4. In poppet valve-actuating mechanism having a reciprocative cage with opposite inner and outer portions, the former being connected to and moving the poppet between open and closed positions, and having rotational reciprocal cam means to variably angularly engage said cage portions,
(a) a set of removable rods connecting and spacing said portions and arranged in pairs on opposite sides of the axis of the cam means and alternately subject to tension imposed by the cam means, and
(b) flats formed on opposite sides of each of said rods throughout the major porton of their length and parallel to the cam means axis.

5. In a poppet-reciprocating cage having an outer part and an inner part engaged with the poppet, said parts being spaced, and reciprocal cam means extending along an axis transverse to the path of reciprocative movement of the cage and operatively engaging the cage parts,
(a) two pairs of rods connecting said cage pairs, one pair on each side of the cam means axis.
(b) each rod having a cross-sectional form with opposite parallel flat sides, said sides being parallel to the cam means axis and extending throughout the major portion of their length, said rods each terminating in threaded stud portions for separable connection with said cage parts.

6. Actuating means according to claim 2 in which the pairs of rods are spaced from each other a distance at least as great as the extent of wiping contact between the cams and the cage parts.

References Cited by the Examiner
UNITED STATES PATENTS

| | | | |
|---|---|---|---|
| Re. 14,228 | 12/1916 | MacVicar | 123—90 |
| 676,542 | 6/1901 | Luitwieler | 74—55 X |
| 1,074,121 | 9/1913 | Kelly | 123—90 |
| 1,410,787 | 3/1922 | Wells. | |
| 1,516,310 | 11/1924 | Ryan | 123—90 |

MARK NEWMAN, *Primary Examiner.*

FRED E. ENGELTHALER, *Examiner.*